US010831210B1

(12) United States Patent
Kobilarov

(10) Patent No.: US 10,831,210 B1
(45) Date of Patent: Nov. 10, 2020

(54) TRAJECTORY GENERATION AND OPTIMIZATION USING CLOSED-FORM NUMERICAL INTEGRATION IN ROUTE-RELATIVE COORDINATES

(71) Applicant: Zoox, Inc., Foster City, CA (US)

(72) Inventor: Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 238 days.

(21) Appl. No.: 16/147,492

(22) Filed: Sep. 28, 2018

(51) Int. Cl.
*G05D 1/02* (2020.01)
(52) U.S. Cl.
CPC ... *G05D 1/0223* (2013.01); *G05D 2201/0213* (2013.01)
(58) Field of Classification Search
CPC .................................................. G05D 1/0223
See application file for complete search history.

(56) References Cited

U.S. PATENT DOCUMENTS

| 8,543,261 | B2 * | 9/2013 | Anderson | B60W 30/09 |
| | | | | 701/3 |
| 2019/0033085 | A1 * | 1/2019 | Ogale | G06N 3/084 |
| 2019/0034794 | A1 * | 1/2019 | Ogale | G01S 17/931 |
| 2019/0220016 | A1 * | 7/2019 | Phillips | B60W 30/0953 |
| 2019/0278284 | A1 * | 9/2019 | Zhang | G06F 9/545 |
| 2020/0097016 | A1 * | 3/2020 | Zhu | G05D 1/0088 |
| 2020/0174490 | A1 * | 6/2020 | Ogale | G05D 1/0231 |

* cited by examiner

*Primary Examiner* — Alex C Dunn
(74) *Attorney, Agent, or Firm* — Lee & Hayes, P.C.

(57) ABSTRACT

Techniques are discussed for generating and optimizing a trajectory using closed-form numerical integration in route-relative coordinates. A decision planner component of an autonomous vehicle, for example, can receive or generate a reference trajectory, which may correspond to an ideal route for an autonomous vehicle to traverse through an environment, such as a center of a road segment. Lateral dynamics (e.g., steering angles, curvature values of trajectory segments) and longitudinal dynamics (e.g., velocity and acceleration) can be represented in a single algorithm such that optimizing the reference trajectory (e.g., based on loss functions or costs) can substantially simultaneously optimize the lateral dynamics and longitudinal dynamics in a single convergence operation. In some cases, the trajectory can be used to control the autonomous vehicle to traverse an environment.

20 Claims, 5 Drawing Sheets

TRAJECTORY GENERATION AND OPTIMIZATION USING CLOSED-FORM NUMERICAL INTEGRATION IN ROUTE-RELATIVE COORDINATES

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, generating routes for an autonomous vehicle can include optimizing vehicle acceleration and steering angle separately, which can be inefficient in a resource-limited or a time-limited environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
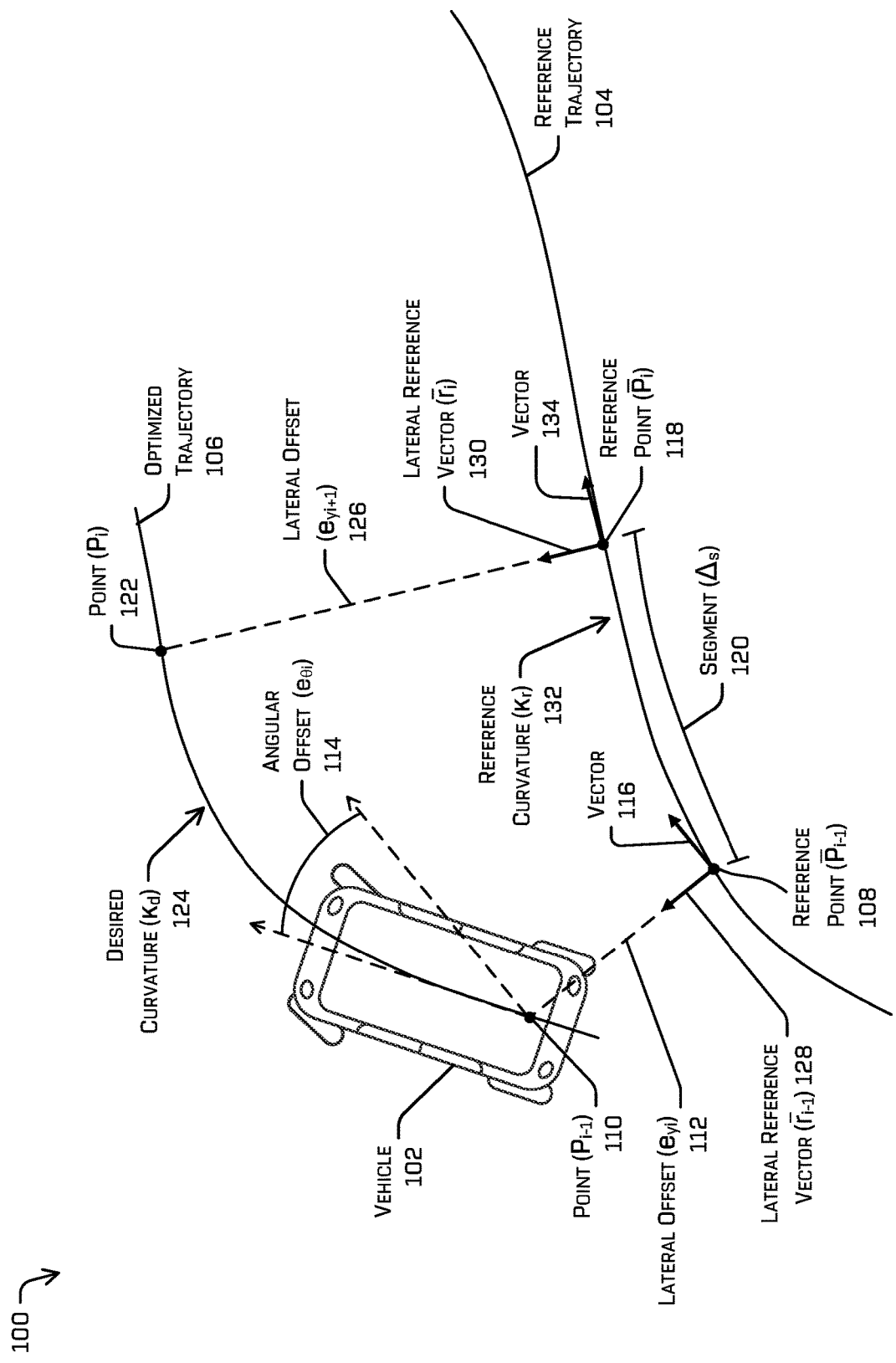
FIG. 1 depicts an example environment including an optimized trajectory of a vehicle relative to a reference trajectory, in accordance with embodiments of the disclosure.

This disclosure is directed to methods, apparatuses, and systems for generating and optimizing a trajectory for an autonomous vehicle using closed-form numerical integration in route-relative coordinates. In some instances, a decision planner component of an autonomous vehicle, for example, can receive a reference trajectory or a desired trajectory, which may correspond to an ideal route for an autonomous vehicle to traverse through an environment, such as a center of a road segment. Lateral dynamics (e.g., steering angles) and longitudinal dynamics (e.g., velocity and acceleration) can be represented in a single algorithm such that optimizing the reference trajectory (e.g., based on loss functions or costs) can substantially simultaneously optimize the lateral dynamics and longitudinal dynamics in a single convergence operation.

In some examples, loss functions for optimizing a desired trajectory with respect to a reference trajectory may include, but are not limited to, one or more of a first loss function based at least in part on a first distance between an autonomous vehicle and an object in the environment, a second loss function based at least in part on a second distance between the autonomous vehicle and a corresponding point associated with the reference trajectory, a third loss function based at least in part on the plurality of target velocities of the autonomous vehicle, or a fourth loss function based at least in part on the plurality of target steering angles. Additional loss functions may be based at least in part on one or more of a lateral acceleration, a longitudinal acceleration, a trajectory curvature, a trajectory curvature rate, passenger comfort, trip duration, and the like. In some instances, optimizing the reference trajectory to generate an optimized trajectory can include substantially simultaneously evaluating the plurality of loss functions to determine the acceleration(s) and steering angles associated with an optimized trajectory.

In some instances, the optimization operations may include using (e.g., evaluating or executing) a projected stage-wise Newton method to generate an optimized trajectory, although other algorithms may be used as well. Although the projected stage-wise Newton method described herein may involve multiple iterations (e.g., backwards passes and/or forwards passes), the optimization may only require a single execution of the projected stage-wise Newton method for a single convergence to generate an optimized trajectory for an autonomous vehicle.

The operations of optimizing the lateral dynamics and longitudinal dynamics in a single algorithm can improve a functioning of a computing device by providing a robust, and fast, generation of vehicle controls. For example, conventional techniques for generating optimized trajectories have included determining a first pass of vehicle velocities, determining vehicle steering angles based on the first pass of vehicle velocities, and subsequently determining a second pass of vehicle velocities based on the vehicle steering angles (e.g., by iteratively and independently optimizing the velocity and steering angles). The techniques discussed herein utilize a single algorithm for optimizing the lateral dynamics and longitudinal dynamics, which represent a reduction in processing and/or memory requirements due to the reduction in iterations associated with individual determinations of parameters. In one non-limiting example, under standard operating conditions, the techniques discussed herein can determine optimized trajectories in less than 1 millisecond on a standard CPU. Accordingly, in some instances, the operations discussed herein may require less processing power, and/or may require less memory than conventional trajectory generation and/or optimization techniques. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In another example, the techniques can be utilized in an aviation or nautical context, or in any system generating a trajectory. Additionally, the techniques described herein can be used with real data (e.g., captured using sensor(s)), simulated data (e.g., generated by a simulator), or any combination of the two.

FIG. 1 depicts an example environment 100 including a vehicle 102, a reference trajectory 104, and an optimized trajectory 106, in accordance with embodiments of the disclosure.

The reference trajectory 104 can correspond to a centerline of a road segment or any drivable surface. In some instances, the reference trajectory 104 can be generated by or received by a planner system of the vehicle 102. In some instances, the reference trajectory 104 can be generated based at least in part on static obstacles in an environment, a minimum or maximum longitudinal acceleration or velocity, a maximum steering angle, vehicle dynamics (e.g., a notion that the wheels do not slip, etc.), etc.

With respect to a reference point ($\bar{p}_{i-1}$) 108 of the reference trajectory 104, a point ($p_{i-1}$) 110 of the vehicle 102 can be defined at least in part by a lateral offset ($e_{y_i}$) 112 relative to the reference trajectory 104 and an angular offset ($e_{\theta_i}$) 114 (also referred to as a yaw or heading error). In some instances, the angular offset 114 can correspond to a difference in an angle between an orientation and/or direction of travel of the vehicle 102 and a vector 116 associated with a direction of the reference trajectory 104 at the reference point 108.

A reference point ($\bar{p}_i$) 118 of the reference trajectory 104 can be separated from the reference point 108 by a segment ($\Delta_s$) 120. In some instances, a length of the segment 120 may be fixed from point to point, and in some instances the length of the segment 120 may be selected based on the vehicle 102, road conditions (e.g., a speed limit, surface conditions, etc.), dynamics of the vehicle 102, processor availability, and the like. In some instances, the reference point 118 can be further associated with a lateral offset from the reference trajectory 104.

With respect to the reference point ($\bar{p}_i$) 118 of the reference trajectory 104, a point ($p_i$) 122 on the optimized trajectory 106 can be defined at least in part by an intersection between a segment having a desired curvature ($\kappa_d$) 124 and a line extending from the reference point 118 defining a lateral offset ($e_{y_{i+1}}$) 126 relative to the reference trajectory 104 at the reference point 118.

In some instances, the segment defined by the desired curvature 124 can be a motion primitive generated in accordance with the techniques discussed in U.S. patent application Ser. No. 15/843,596, filed Dec. 15, 2017. Further, the segment defined by the desired curvature 124 can be generated in accordance with the techniques discussed in U.S. patent application Ser. No. 15/843,512, filed Dec. 15, 2017. Application Ser. Nos. 15/843,596 and 15/843,512 are herein incorporated by reference, in their entirety.

The reference point 108 can be associated with a lateral reference vector ($\bar{r}_{i-1}$) 128 (e.g., perpendicular to the vector 116) and the vector 116 (e.g., tangent to the reference point 108 or associated with a direction of the reference trajectory 104 at the reference point 108).

The reference point 118 can be associated with a lateral reference vector (ft) 130 (e.g., perpendicular to the vector 134) and the vector 134 (e.g., tangent to the reference point 118 or associated with a direction of the reference trajectory 104 at the reference point 118).

In some instances, the vehicle 102 can be defined in route-frame coordinates by a state $x=(e_y, e_\theta, l, v)$, where $e_y$ is the lateral error, $e_\theta$ is the heading error, $l$ is an arc-length, and $v$ is the body-fixed longitudinal velocity. The controls $u=(\kappa, \alpha)$ can define a curvature $\kappa$ and the longitudinal acceleration $\alpha$.

An arc-length of the reference trajectory 104 can be defined as s, and accordingly, the ordinary differential equation with respect to s can be represented as:

$$e'_y = \tan e_\theta (1 - \kappa_r e_y) \quad (1)$$

$$e'_\theta = \frac{\kappa(1 - \kappa_r e_y)}{\cos e_\theta} - \kappa_r \quad (2)$$

$$l' = \frac{1 - \kappa_r e_y}{\cos e_\theta} \quad (3)$$

$$v' = \frac{a}{v \cos e_\theta}(1 - \kappa_r e_y) \quad (4)$$

where all variables can be understood as functions of s and thus $$e'_y(s) \equiv \frac{\partial}{\partial s} e_y(s),$$

and $\kappa_s(s)$ corresponds to the reference curvature (e.g., 132).

In some instances, the direct control model (described above in equations (1)-(4)) can be extended to a smooth control model for which the inputs are the desired curvature ($\kappa_d$) (e.g., 124) and acceleration $a_d$ which can be achieved after some displacements (e.g., the segment 120).

In some instances, in the smooth model, the actual curvature and acceleration at $s+\Delta s$ correspond to the desired curvature (e.g., 124) and acceleration applied at s, which can be expressed as:

$$\kappa(S+\Delta s) = \kappa_d(s), \quad (5)$$

$$\alpha(s+\Delta s) = \alpha_d(s). \quad (6)$$

In some examples, the two models can be described as:

| Description | Full State | Lateral | Longitudinal | Control |
| --- | --- | --- | --- | --- |
| Direct Control | ($e_y$, $e_\theta$, l, v) | ($e_y$, $e_\theta$) | (l, v) | ($\kappa$, a) |
| Smooth Control | ($e_y$, $e_\theta$, k, l, v, a) | ($e_y$, $e_\theta$, $\kappa$) | (l, v, a) | ($\kappa_d$, $a_d$) |

In some examples, generating an optimized trajectory can include performing efficient and accurate integration using a fixed arc-length step, $\Delta s$ (e.g., 120), which can be used as a basis for trajectory optimization. Let $x_i \in \mathbb{R}^n$ denote the state at $s_i$ (e.g., the i-th point along curve s), and accordingly, the integration can be defined using the mapping:

$$x_{i+1} = f_i(x_i, u_i) \quad (7)$$

which transforms the current state into the next state at point $s_{i+1} = s_i + \Delta s$.

In some examples, generating the optimized trajectories (e.g., a series of states) $\{x_0, x_1, \ldots, x_N\}$ corresponding to a control sequence $\{u_0, u_1, \ldots, u_{N-1}\}$ may include minimizing the following cost function:

$$J_0 = L_N(N) + \Sigma_{i=0}^{N-1} L_i(x_i, u_i), \quad (8)$$

subject to $x_{i+1} = f_i(x_i, u_i)$, $u_k \in U_k$, $C_N x_N - d_N = 0$, where $L_i$ are given cost functions, $U_k$ is a convex set and $C_N \in \mathbb{R}^{m \times n}$ has full rank $m \leq n$, where $C_N$ is a selection matrix (e.g., a matrix used to select only those relevant portions of the state $x_N$), $x_N$ corresponds to a last state (or the n-th state), and $d_N$ corresponds to a desired control at the last state. Such costs may be any one or more of the costs described in detail herein.

The generation and optimization of optimized reference trajectories is discussed below in connection with FIG. 2, as well as throughout this disclosure.

Figure 2:
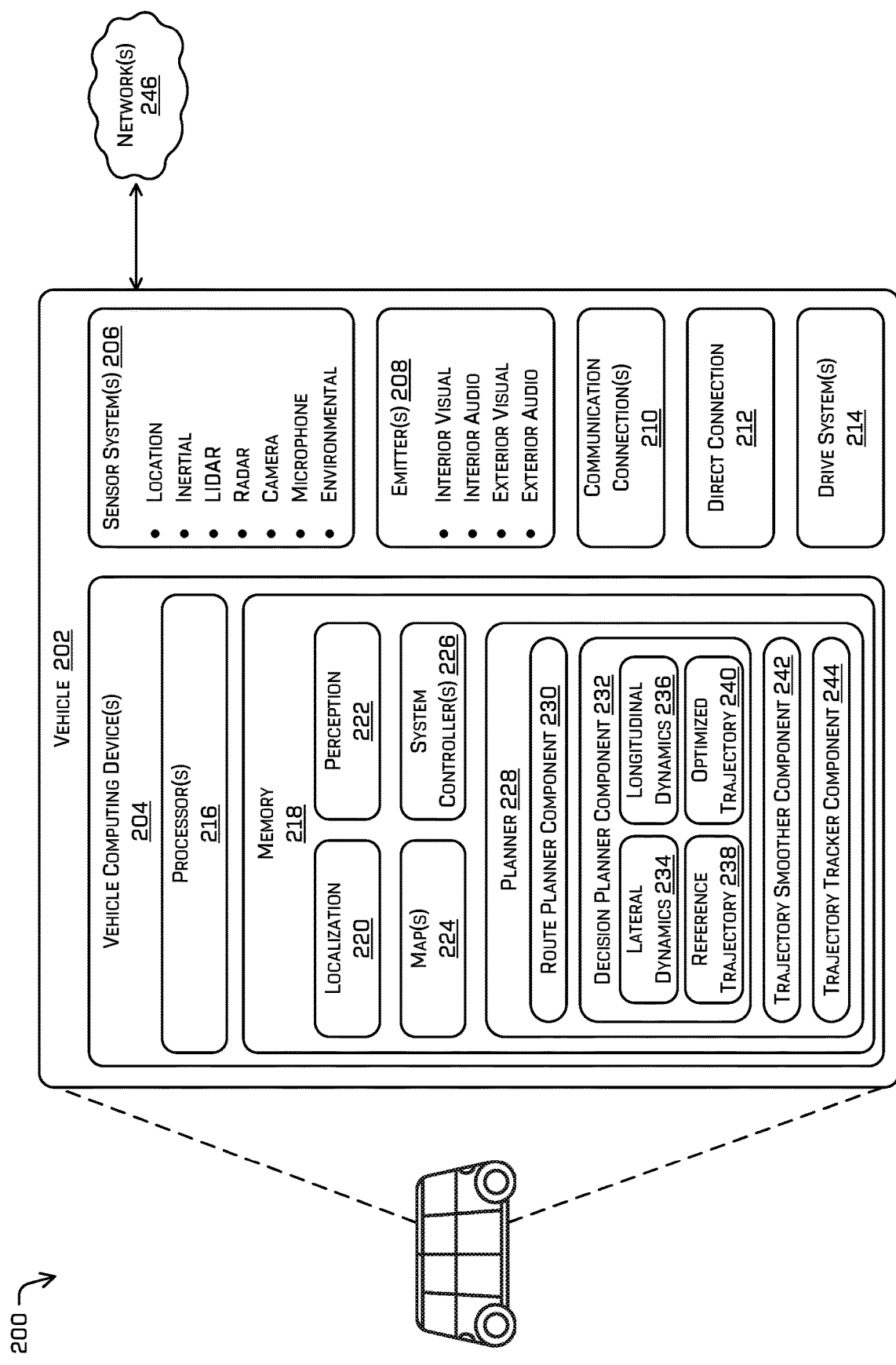
FIG. 2 depicts a block diagram of an example system for implementing the techniques described herein.

FIG. 2 depicts a block diagram of an example system 200 for implementing the techniques described herein. In at least one example, the system 200 can include a vehicle 202, which can correspond to the vehicle 102 in FIG. 1.

In some instances, the vehicle 202 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 can be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 202 can include a vehicle computing device 204, one or more sensor systems 206, one or more emitters 208, one or more communication connections 210, at least one direct connection 212, and one or more drive systems 214.

The vehicle computing device 204 can include one or more processors 216 and memory 218 communicatively coupled with the one or more processors 216. In the illustrated example, the vehicle 202 is an autonomous vehicle; however, the vehicle 202 could be any other type of vehicle (e.g., a robotic platform). In the illustrated example, the memory 218 of the vehicle computing device 204 stores a localization component 220, a perception component 222, one or more maps 224, one or more system controllers 226, and planner component 228 including a route planner component 230, a decision planner component 232 including a lateral dynamics component 234, a longitudinal dynamics component 236, a reference trajectory component 238, and an optimized trajectory component 240, a trajectory smoother component 242, and a trajectory tracker component 244. Though depicted in FIG. 2 as residing in the memory 218 for illustrative purposes, it is contemplated that the localization component 220, the perception component 222, the one or more maps 224, the one or more system controllers 226, the planner component 228, the route planner component 230, the decision planner component 232, the lateral dynamics component 234, the longitudinal dynamics component 236, the reference trajectory component 238, the optimized trajectory component 240, the trajectory smoother component 242, and/or the trajectory tracker component 244 can additionally, or alternatively, be accessible to the vehicle 202 (e.g., stored on, or otherwise accessible by, memory remote from the vehicle 202).

In at least one example, the localization component 220 can include functionality to receive data from the sensor system(s) 206 to determine a position and/or orientation of the vehicle 202 (e.g., one or more of an x-, y-, z-position, roll, pitch, or yaw). For example, the localization component 220 can include and/or request/receive a map of an environment and can continuously determine a location and/or orientation of the autonomous vehicle within the map. In some instances, the localization component 220 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 220 can provide data to various components of the vehicle 202 to determine an initial position of an autonomous vehicle for generating a trajectory and/or for determining to load map data into memory, as discussed herein.

In some instances, the perception component 222 can include functionality to perform object detection, segmentation, and/or classification. In some examples, the perception component 222 can provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 218 can further include one or more maps 224 that can be used by the vehicle 202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like); etc. In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 224 can include at least one map (e.g., images and/or a mesh). In some examples, the vehicle 202 can be controlled based at least in part on the maps 224. That is, the maps 224 can be used in connection with the localization component 220, the perception component 222, and/or the planner component 228 to determine a location of the vehicle 202, identify objects in an environment, and/or generate routes and/or trajectories to navigate within an environment.

In some examples, the one or more maps 224 can be stored on a remote computing device(s) accessible via network(s) 246. In some examples, multiple maps 224 can be stored based on, for example, a characteristic (e.g., type of entity, time of day, day of week, season of the year, etc.). Storing multiple maps 224 can have similar memory requirements, but increase the speed at which data in a map can be accessed.

In at least one example, the vehicle computing device 204 can include one or more system controllers 226, which can be configured to control steering, propulsion, braking, safety, emitters, communication, and other systems of the vehicle 202. These system controller(s) 226 can communicate with and/or control corresponding systems of the drive system(s) 214 and/or other components of the vehicle 202.

In general, the planner component 228 can determine a path for the vehicle 202 to follow to traverse through an environment. As discussed above, the planner component 228 can include the route planner component 230, the decision planner component 232 including the lateral dynamics component 234, the longitudinal dynamics component 236, the reference trajectory component 238, and the optimized trajectory component 240, the trajectory smoother component 242, and the trajectory tracker component 244.

In some instances, the route planner component 230 can be configured to determine a most efficient route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. In at least one example, the route planner component 230 can perform a search, such as a graph search, on top of a map to identify a route to guide the autonomous vehicle from a first location to a second location. In at least one example, the route planner component 230 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In some examples, the route planner component 230 can identify two or more candidate routes for guiding the autonomous vehicle 202 from the first location to the second location. In such examples, the route planner component 230 can rank the two or more candidate routes based on route planning constraint(s). Route planning constraint(s) can include rules of the road, travel time, travel distance, etc. In at least one example, the route planner component 230 can determine that a top-ranking candidate route is the route for guiding the autonomous vehicle 202 from the first location to the second location. The route planner component 230 can output a sequence of waypoints corresponding to the route to the decision planner component 232.

In general, and in some instances, the decision planner component 232 can receive the route (e.g., the sequence of waypoints) and can generate an instruction for guiding the autonomous vehicle 202 along at least a portion of the route from the first location to the second location. In at least one example, the decision planner component 232 can determine how to guide the autonomous vehicle 202 from a first waypoint in the sequence of waypoints to a second waypoint in the sequence of waypoints. In some examples, the instruction can be a trajectory, or a portion of a trajectory. In such examples, the decision planner component 232 can generate a sequence of actions (e.g., drive down the road, accelerate, change lanes, turn left, etc.) to guide the autonomous vehicle 202 along the route. In some cases, the decision planner component 232 can generate various actions in the alternative (e.g., discussed in connection with FIG. 3). In other examples, the instruction can be a policy. A policy can be used to determine a trajectory of the autonomous vehicle 202 based on real-time processed sensor data received from sensor(s) on the autonomous vehicle 202.

Further, the decision planner component 232 can include the lateral dynamics component 234, the longitudinal dynamics component 236, the reference trajectory component 238, and the optimized trajectory component 240.

In some instances, the lateral dynamics component 234 can be used to define lateral dynamics (e.g., a steering angle) of the vehicle 202, as shown in the following equations.

The i-th frame can be denoted by $g_i \in SE(2)$, while the relative transform to the subsequent reference frame can be defined as $\bar{g}_i = g_i^{-1} g_{i+1}$. Let:

$$\bar{g} = \begin{pmatrix} \bar{R} & \bar{p} \\ 0 & 1 \end{pmatrix},$$

where $\bar{R} \in SO(2)$ is the relative rotation (corresponding to angle $\bar{\theta}$) and $\bar{p} \in \mathbb{R}^2$ is the relative translation. The end-point of the arc corresponding to the system motion with curvature $\kappa$, resulting in heading error $e_{\theta_{i+1}}$ then takes the form:

$$p_i(e_{\theta_{i+1}}) = \frac{1}{\kappa_i} \begin{pmatrix} \sin(e_{\theta_{i+1}} + \bar{\theta}_i) - \sin e_{\theta_i} \\ \cos e_{\theta_i} - \cos(e_{\theta_{i+1}} + \bar{\theta}_i) + e_{yi}\kappa_i \end{pmatrix} \quad (9)$$

expressed in the reference frame $g_i$.

In some instances, the integrator update step is equivalent to finding $(e_{\theta_{i+1}}, e_{y_{i+1}})$ which satisfy:

$$p_i(e_{\theta_{i+1}}) = \bar{p}_i + e_{y_{i+1}} \bar{r}_i, \quad (10)$$

where $$\bar{r}_i = \bar{R}_i \begin{pmatrix} 0 \\ 1 \end{pmatrix}$$

is the lateral unit vector of the relative reference rotation defined by $$\begin{bmatrix} \cos(\bar{\theta}) & -\sin(\bar{\theta}) \\ \sin(\bar{\theta}) & \cos(\bar{\theta}) \end{bmatrix}.$$

In some instances, the two equations with two unknowns can be solved exactly. First, the relationship in equation (10) can be expressed as:

$$\begin{pmatrix} \sin(e_{\theta_{i+1}} + \bar{\theta}_i) \\ -\cos(e_{\theta_{i+1}} + \bar{\theta}_i) \end{pmatrix} = \begin{pmatrix} \sin(e_{\theta_i}) \\ -\cos(e_{\theta_i}) \end{pmatrix} + \kappa_i \left[ -\begin{pmatrix} 0 \\ e_{yi} \end{pmatrix} + \bar{p}_i + e_{y_{i+1}} \bar{r}_i \right], \quad (11)$$

and after taking the squared norm of each side and dividing by the curvature $\kappa_i$, the dependence on $e_{\theta_{i+1}}$ can temporarily be removed to and solved for the unknown $e_{y_{i+1}}$ as the root of the quadratic equation:

$$2a_i^T b_i + \kappa_i \|b_i\|^2 + 2(a_i + \kappa_i b_i)^T \bar{r}_i e_{y_{i+1}} + \kappa_i e_{y_{i+1}}^2 = 0,$$

where $$a_i = \begin{pmatrix} \sin(e_{\theta_i}) \\ -\cos(e_{\theta_i}) \end{pmatrix}$$

and $$b_i = -\begin{pmatrix} 0 \\ e_{yi} \end{pmatrix} + \bar{p}_i.$$

$+\bar{p}_i$. From the two roots, in some instances, the root that is closer to the previous offset $e_{y_i}$ can be selected. However, in some instances, the root that is further from the previous offset $e_{y_i}$ can be selected as well, or any combination thereof. Afterwards, the second unknown $e_{\theta_{i+1}}$ can be found using atan 2 applied to the right-hand-side of equation (11). In examples where the curvature is near zero, the solution reduces to:

$$e_{y_{i+1}} = -\frac{a_i^T b_i}{a_i^T \bar{r}_i} \quad (12)$$

In some instances, in order to be able to project onto the reference next frame, only a subset of curvatures can be allowed. That subset of allowed curvatures can be given by $\kappa_i \in [\kappa_i^-, \kappa_i^+]$, where $\kappa^\pm$ are the minimum and maximum roots of the quadratic equation:

$$(a^T \bar{r})^2 + 2(a^T \bar{r} b^T \bar{r} - a^T b)\kappa + [(b^T \bar{r})^2 - \|b\|^2 \kappa^2] = 0 \quad (13)$$

In some instances, the longitudinal dynamics component 236 can be used to define longitudinal dynamics (e.g., an acceleration) of the vehicle 202.

In some instances, the longitudinal dynamics corresponds to computing the traveled arc-length:

$$\Delta l_i = \begin{cases} \dfrac{e_{\theta_{i+1}} + \bar{\theta}_i - e_{\theta_i}}{\kappa_i} & \text{for } \kappa_i \neq 0 \\ \|\bar{P}_i + e_{y_{i+1}} \bar{r}_i\| & \text{otherwise} \end{cases} \quad (14)$$

and then updating the velocity in closed form:

$$v_{i+1} = \sqrt{v_i^2 + 2a\Delta l_i} \quad (15)$$

In some instances, the reference trajectory component 238 can be configured to generate an "ideal" route based at least in part on the route provided by the route planner component 230. In some instances, the reference trajectory component 238 can generate a plurality of reference trajectories, each reference trajectory corresponding to an individual action. In some instances, a reference trajectory can be based at least in part on a centerline of a road segment (e.g., to orient a vehicle within a center of a lane). In some instances, reference trajectories can be determined by the reference trajectory component 238 and/or can be received from an external computing device (e.g., from a teleoperations center) via the network(s) 246.

In some instances, the optimized trajectory component 240 can perform an optimization based on a reference trajectory to generate an optimized trajectory. In some instances, the optimized trajectory component 240 can use a projected stage-wise Newton method to evaluate a plurality of loss functions to generate the optimized trajectory. For example, the following loss functions can be used:

$$L_i^{ref}(x, u) = \frac{1}{2} \|x - \bar{x}_i\|_{Q_i}^2 + \frac{1}{2} \|u - \bar{u}_i\|_{R_i}^2 \quad (16)$$

$$L_N^{ref}(x) = \frac{1}{2} \|x - x_N\|_{Q_N}^2 \quad (17)$$

$$L_i^{env}(x) = \frac{w_{e_y}}{2} \left( \left[e_y - e_{y_i}^+ - \varepsilon_{e_y}\right]_{>0}^2 + \left[e_y - e_{y_i}^- + \varepsilon_{e_y}\right]_{<0}^2 \right) \quad (18)$$

$$L_i^{lat}(x, u) = \frac{w_k}{2} \left(\frac{k_d - \kappa}{\Delta t_{ref}}\right)^2 + L_i^{env}(x) \quad (19)$$

$$L_i^{lon}(x, u) = \frac{w_a}{2} \left(\frac{a_d - a}{\Delta t_{ref}}\right)^2 + \frac{w_v}{2} ([v - v_i^+ - \varepsilon_v]_{>0}^2) \quad (20)$$

In some examples, equation (16) corresponds to a loss function based at least in part on a distance between the autonomous vehicle and a corresponding point associated with the reference trajectory.

In some examples, equation (17) corresponds to the distance between the autonomous vehicle and the reference trajectory at the last point (or n-th point) on the reference trajectory.

In some examples, equation (18) corresponds to a loss function based at least in part on a distance between the autonomous vehicle and an object in the environment. In some examples, the variable $w_{e_y}$ corresponds to a weight associated with the lateral offset. In some examples, the variables $e_{y_i}^+$ and $e_{y_i}^-$ correspond to desired lateral offsets. In some examples, the variable $\varepsilon_{e_y}$ represents a lateral offset margin.

In some examples, equation (19) corresponds to a loss function or a fourth loss function based at least in part on the plurality of curvature values associated with the reference curvature and desired curvatures.

In some examples, equation (20) corresponds to a loss function based at least in part on the plurality of target velocities or longitudinal acceleration of the autonomous vehicle. In some examples, the variable $w_a$ corresponds to a weight associated with a lateral acceleration, and the variable $w_v$ corresponds to a weight associated with a lateral velocity. In some examples, the variable $\varepsilon_v$ corresponds to a velocity margin.

Additional loss functions can be based at least in part on one or more of lateral acceleration, curvature(s), comfort, trip duration, and the like. As can be understood, one or more loss functions can be based on some or all of the loss functions discussed herein, but is not limited to the loss functions discussed herein.

In some instances, the above-listed loss functions can be evaluated together to determine the complete costs associated with an optimized trajectory as:

$$L_i(x,u) = L_i^{ref}(x,u) + L_i^{lat}(x,u) + L_i^{lon}(x,u) \quad (21)$$

$$L_N(x,u) = L_N^{ref}(x,u) + L_i^{env}(x) \quad (22)$$

Additional discussion of the loss functions is provided below in connection with FIG. 5.

In some instances, the trajectory smoother component 242 can include functionality to receive an instruction (e.g., from the decision planner component 232) and optimize the instruction based on objects identified in the environment. In at least one example, the trajectory smoother component 242 can access, receive, and/or determine real-time processed sensor data to determine object(s) in the environment which the autonomous vehicle 202 is travelling. In the at least one example, the trajectory smoother component 242 can process the instruction in view of the real-time processed sensor data.

In an example where the instruction is a trajectory, the trajectory smoother component 242 can leverage model(s) and/or algorithm(s), constraint(s), and/or cost(s) to optimize the trajectory. For instance, the trajectory smoother component 242 can utilize model(s) and/or algorithm(s) including, but not limited to, differential dynamic programming, interior point optimization, sequential quadratic programming, etc. to refine the trajectory. In at least one example, the constraint(s) can include, but are not limited to, geometry and/or physical properties of the vehicle and/or environment, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle can be optimized to include a positive, a negative, or a zero value. In at least one example, a rotation of the autonomous vehicle can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory smoother component 242 can generate an output trajectory.

In an example where the instruction is a policy, the trajectory smoother component 242 can leverage model(s) and/or algorithm(s), constraint(s), and/or cost(s) to generate a trajectory based on the policy and real-time processed sensor data. For instance, the trajectory smoother component 242 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

As described above, the trajectory smoother component 242 can access, receive, and/or determine real-time processed sensor data. The trajectory smoother component 242 can leverage the real-time processed sensor data to generate an output trajectory. The trajectory smoother component 242 can utilize a more detailed model of the autonomous vehicle than the decision planner component 232. Processing that utilizes such a detailed model can be computationally expensive. Additionally, the trajectory smoother component 242 can output an output trajectory within a predetermined amount of time after receiving the real-time processed sensor data. For instance, in at least one example, the trajectory smoother component 242 can receive an interrupt requesting an output trajectory and the trajectory smoother component 242 can provide an output trajectory responsive to receiving the interrupt.

In some instances, the trajectory tracker component 244 can include functionality to receive an output trajectory from the trajectory smoother component 242 and can compute commands for actuating steering and acceleration of the autonomous vehicle 202 to enable the autonomous vehicle 202 to follow the output trajectory. In at least one example, the trajectory tracker component 244 can receive the output trajectory and can compute a steering angle and velocity to enable the autonomous vehicle 202 to follow the output trajectory. In some examples, the trajectory tracker component 244 can include a separate vehicle controller configured to control steering, propulsion, braking, safety, emitters, communication, and other systems of the vehicle.

In some instances, the planner component 228 can include a prediction component to generate predicted trajectories of objects in an environment. For example, a prediction component can generate one or more predicted trajectories for vehicles, pedestrians, animals, and the like within a threshold distance from the vehicle 202. In some instances, a prediction component can measure a trace of an object and generate a trajectory for the object based on observed and predicted behavior.

As can be understood, the components discussed herein (e.g., the localization component 220, the perception component 222, the one or more maps 224, the one or more system controllers 226, the planner component 228, the route planner component 230, the decision planner component 232, the lateral dynamics component 234, the longitudinal dynamics component 236, the reference trajectory component 238, the optimized trajectory component 240, the trajectory smoother component 242, and the trajectory tracker component 244) are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 218 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 206 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device 204. Additionally or alternatively, the sensor system(s) 206 can send sensor data, via the one or more networks 246, to the one or more computing device(s) at a particular frequency, after a lapse of a predetermined period of time, in near real-time, etc.

The vehicle 202 can also include one or more emitters 208 for emitting light and/or sound, as described above. The emitters 208 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 202 can also include one or more communication connection(s) 210 that enable communication between the vehicle 202 and one or more other local or remote computing device(s). For instance, the communication connection(s) 210 can facilitate communication with other local computing device(s) on the vehicle 202 and/or the drive system(s) 214. Also, the communication connection(s) 210 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device 204 to another computing device or a network, such as network(s) 246. For example, the communications connection(s) 210 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive system(s) 214. In some examples, the vehicle 202 can have a single drive system 214. In at least one example, if the vehicle 202 has multiple drive systems 214, individual drive systems 214 can be positioned on opposite ends of the vehicle 202 (e.g., the front and the rear, etc.). In at least one example, the drive system(s) 214 can include one or more sensor systems to detect conditions of the drive system(s) 214 and/or the surroundings of the vehicle 202. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, radar sensors, etc. Some sensors, such as the wheel encoders can be unique to the drive system(s) 214. In some cases, the sensor system(s) on the drive system(s) 214 can overlap or supplement corresponding systems of the vehicle 202 (e.g., sensor system(s) 206).

The drive system(s) 214 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 214. Furthermore, the drive system(s) 214 also include one or more communication connection(s) that enable communication by the respective drive system with one or more other local or remote computing device(s).

In at least one example, the direct connection 212 can provide a physical interface to couple the one or more drive system(s) 214 with the body of the vehicle 202. For example, the direct connection 212 can allow the transfer of energy, fluids, air, data, etc. between the drive system(s) 214 and the vehicle. In some instances, the direct connection 212 can further releasably secure the drive system(s) 214 to the body of the vehicle 202.

In at least one example, the localization component 220, the perception component 222, the one or more maps 224, the one or more system controllers 226, the planner component 228, the route planner component 230, the decision planner component 232, the lateral dynamics component 234, the longitudinal dynamics component 236, the reference trajectory component 238, the optimized trajectory component 240, the trajectory smoother component 242, and the trajectory tracker component 244 can process sensor data, as described above, and can send their respective outputs, over the one or more network(s) 246, to one or more computing device(s). In at least one example, the aforementioned components can send their respective outputs to the one or more computing device(s) at a particular frequency, after a lapse of a predetermined period of time, in near real-time, etc.

In some examples, the vehicle 202 can send sensor data to one or more computing device(s) via the network(s) 246. In some examples, the vehicle 202 can send raw sensor data to the computing device(s). In other examples, the vehicle 202 can send processed sensor data and/or representations of sensor data to the computing device(s). In some examples, the vehicle 202 can send sensor data to the computing device(s) at a particular frequency, after a lapse of a predetermined period of time, in near real-time, etc. In some cases, the vehicle 202 can send sensor data (raw or processed) to the computing device(s) as one or more log files.

The processor(s) 216 of the vehicle 202 can be any suitable processor capable of executing instructions to process data and perform operations as described herein. By way of example and not limitation, the processor(s) 216 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218 is an example of non-transitory computer-readable media. The memory 218 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 218 can include at least a working memory and a storage memory. For example, the working memory may be a high-speed memory of limited capacity (e.g., cache memory) that is used for storing data to be operated on by the processor(s) 216. In some instances, the memory 218 can include a storage memory that may be a lower-speed memory of relatively large capacity that is used for long-term storage of data. In some cases, the processor(s) 216 cannot operate directly on data that is stored in the storage memory, and data may need to be loaded into a working memory for performing operations based on the data, as discussed herein.

Figure 3:
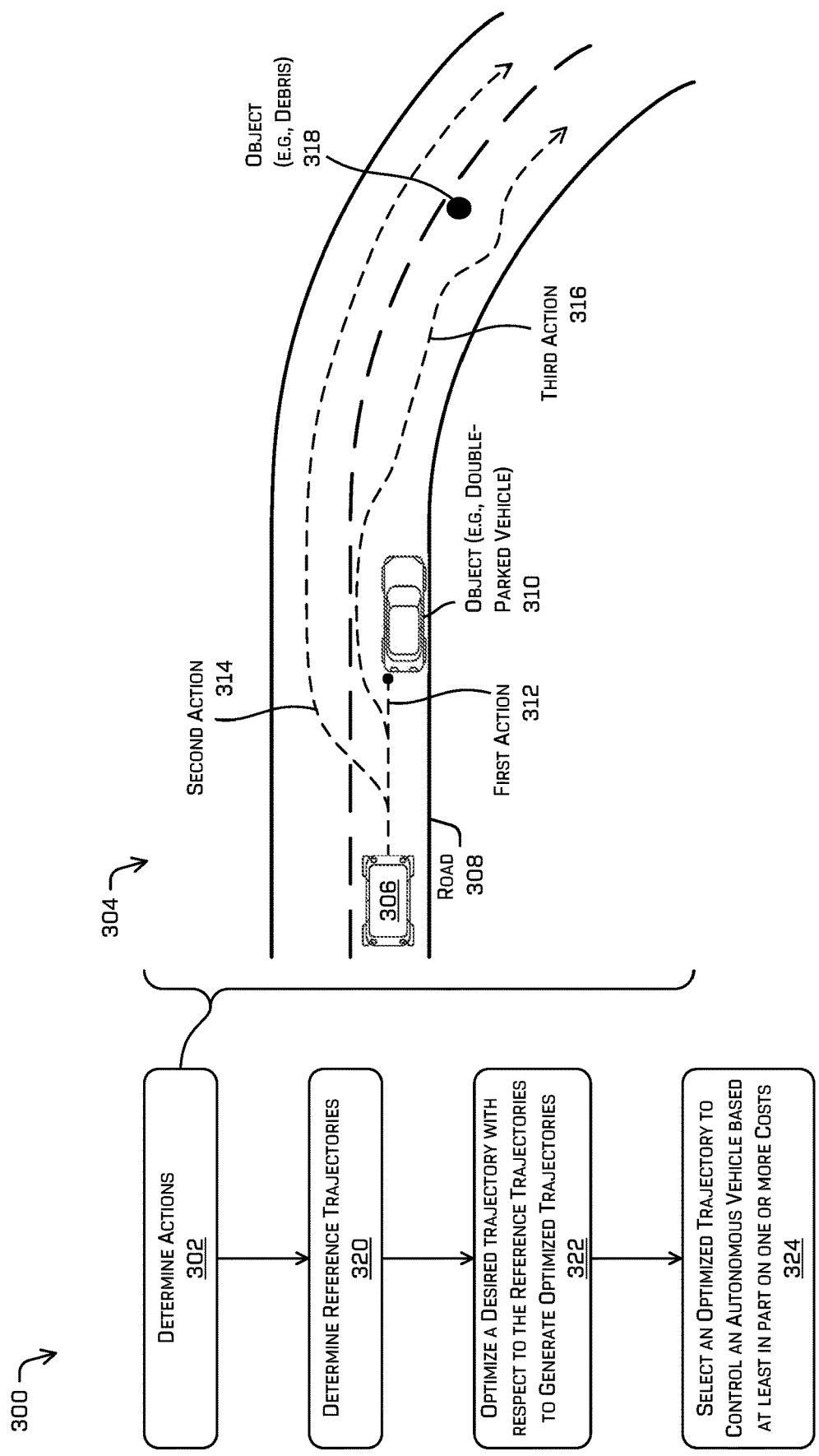
FIG. 3 illustrates a pictorial flow diagram of an example process for determining actions for an autonomous vehicle, determining reference trajectories, optimizing the reference trajectories to generate optimized trajectories, and controlling the autonomous vehicle based on an optimized trajectory, in accordance with embodiments of the disclosure.
Figure 4:
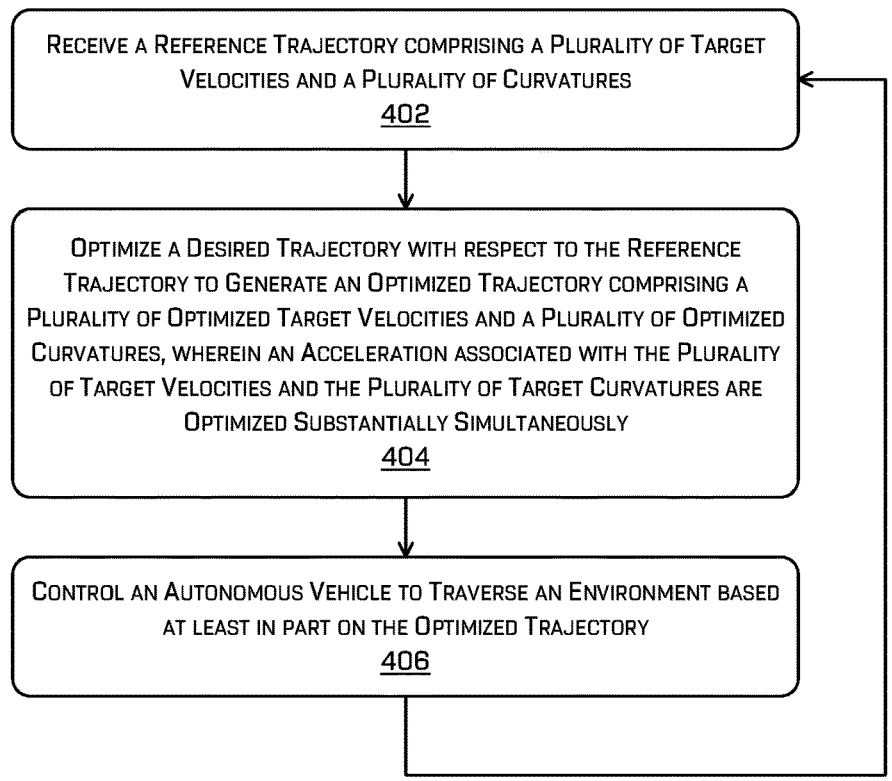
FIG. 4 depicts an example process for receiving a reference trajectory and for optimizing the reference trajectory to generate an optimized trajectory, in accordance with embodiments of the disclosure.
Figure 5:
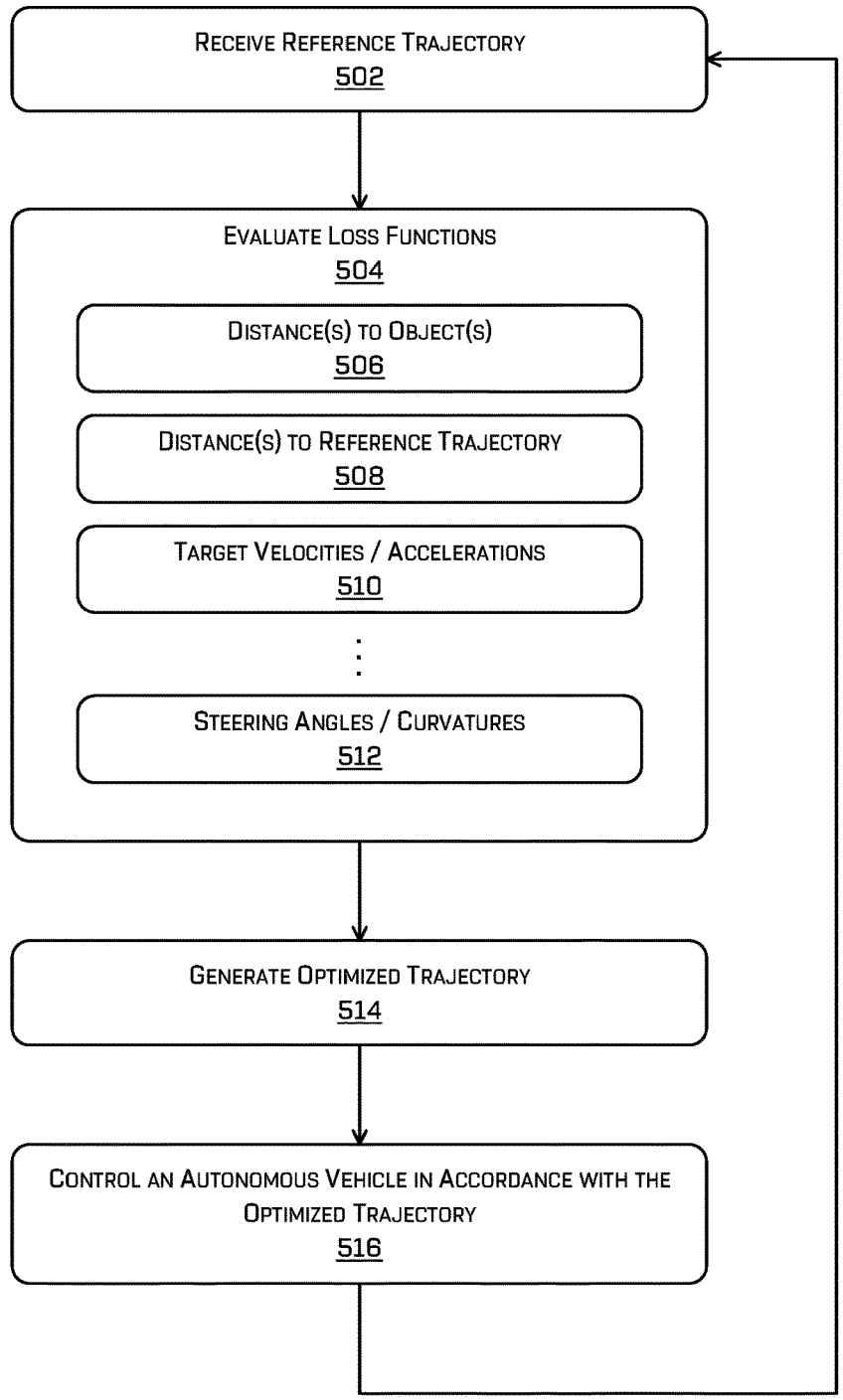
FIG. 5 depicts another example process for receiving a reference trajectory and for optimizing the reference trajectory to generate an optimized trajectory, in accordance with embodiments of the disclosure.

FIGS. 3-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates a pictorial flow diagram 300 of an example process for determining actions for an autonomous vehicle, determining reference trajectories, optimizing the reference trajectories to generate optimized trajectories, and controlling the autonomous vehicle based on one optimized trajectory, in accordance with embodiments of the disclosure.

At operation 302, the process can include determining one or more actions for a vehicle in an environment. An example 304 illustrates a vehicle 306 traversing a road 308. In the example 304, an object 310, such as a double-parked vehicle, is located in a lane of the road 308 where the vehicle 306 is currently located. In some instances, the operation 302 can include determining a number of actions that the vehicle 306 can take in view of the object 310 in the road 308. A first action 312 can include the vehicle 306 staying in its lane in the road 308 and slowing to a stop behind the object 310. A second action 314 can include the vehicle 306 changing lanes to a lane that is unoccupied by the object 310. A third action 316 can include the vehicle 306 navigating around the object 310 without switching lanes in the road 308, and subsequently navigating around an object 318, such as debris, in the road 308. In some examples, possible actions may include, but are not limited to: drive in a current lane, change to a left lane, change to a right lane, navigate around an obstacle and return to lane, merge in a lane, and a teleoperations action (e.g., requesting and/or receiving instructions from a remote computing device).

By way of example, and without limitation, the decision planner component 232 can determine the actions 312, 314, and 316 in the example 304 based at least in part on the geometry of the road 308 and/or based on the objects 310 and 318 in the environment. In some examples, the actions 312, 314, and 316 can be based on static objects in the environment and may not reflect dynamic objects in the environment.

At operation 320, the process can include determining reference trajectories corresponding to the actions determined in the operation 304. In some instances, the operation 320 can include determining an individual reference trajectory for each individual action. In some instances, the operation 320 can include generating a reference trajectory, which may correspond to an ideal route for an autonomous vehicle to traverse through an environment, such as a center of a road segment. In some instances, a reference trajectory can be generated based at least in part on static and/or dynamic obstacles in an environment, a minimum or maximum longitudinal acceleration or velocity, a maximum steering angle, vehicle dynamics (e.g., a notion that the wheels do not slip, etc.).

At operation 322, the process can include optimizing a desired trajectory with respect to the reference trajectories to generate optimized trajectories. For example, the operation 322 can include generating an individual optimized trajectory for each reference trajectory determined in the operation 320. In some examples, the operation 322 can include substantially simultaneously determining vehicle accelerations and steering angles for each optimized trajectory using a single convergence of a projected stage-wise Newton method. In some examples, the operation 322 can include evaluating a plurality of loss functions to determine a cost of each trajectory with respect to a first distance between an autonomous vehicle and an object in the environment, a second distance between the autonomous vehicle and a corresponding point associated with the reference trajectory, a plurality of target velocities of the autonomous vehicle, and/or a plurality of target steering angles.

At operation 324, the process can include selecting an optimized trajectory to control an autonomous vehicle (e.g., the vehicle 306) based at least in part on one or more costs determined by the loss functions in the operation 322. In some cases, an optimized trajectory can be selected as representing a lowest cost trajectory. In some cases, the optimized trajectory selected in the operation 324 can represent an optimal trajectory for traversing the environment.

FIG. 4 depicts an example process 400 for receiving a reference trajectory and for optimizing a desired trajectory with respect to the reference trajectory to generate an optimized trajectory, in accordance with embodiments of the disclosure. For example, some or all of the process 400 can be performed by one or more components in FIG. 2, as described herein. For example, some or all of the process 400 can be performed by the vehicle computing device(s) 204.

At operation 402, the process can include receiving a reference trajectory comprising a sequence of inertial frames with target velocities, lateral offsets, relative orientations, and desired curvature. In some instances, the reference trajectory can include a plurality of target velocities and a plurality of steering angles. In some instances, a point on the reference trajectory can be associated with an individual target velocity and an individual curvature. In some instances, the reference trajectory may correspond to an ideal route for an autonomous vehicle to traverse through an environment, such as a center of a road segment. In some instances, a reference trajectory can be generated based at least in part on static and/or dynamic obstacles in an environment, a minimum or maximum longitudinal acceleration or velocity, a maximum steering angle, vehicle dynamics (e.g., a notion that the wheels do not slip, etc.).

At operation 404, the process can include optimizing a desired trajectory with respect to the reference trajectory to generate an optimized trajectory comprising a plurality of optimized target velocities and a plurality of optimized curvature angles, wherein 1) an acceleration (e.g., the longitudinal acceleration) associated with the plurality of target velocities and 2) the plurality of target curvatures are optimized simultaneously. As discussed herein, the acceleration, target velocities, and/or target curvatures can be represented in a single algorithm that can be determined after a single execution of a projected stage-wise Newton method until a single convergence. In some cases, the single convergence may include a number of individual iterations of backwards and/or forwards sweeps of the projected stage-wise Newton method to determine the lateral dynamics and longitudinal dynamics associated with an optimized trajectory.

At operation 406, the process can include controlling an autonomous vehicle to traverse an environment based at least in part on the optimized trajectory. In some instances, the optimized trajectory can be provided to the trajectory smoother component 242 and/or the trajectory tracker component 244 to refine the optimized trajectory and/or to generate control signals for the various motors and steering actuators of the autonomous vehicle.

FIG. 5 depicts another example process 500 for receiving a reference trajectory and for optimizing a desired trajectory with respect to the reference trajectory to generate an optimized trajectory, in accordance with embodiments of the disclosure. For example, some or all of the process 500 can be performed by one or more components in FIG. 2, as described herein. For example, some or all of the process 500 can be performed by the vehicle computing device(s) 204.

At operation 502, the process can include receiving a reference trajectory. In some examples, the operation 502 can substantially correspond to the operation 402. In some examples, the operation 502 can include receiving a single reference trajectory or a plurality of reference trajectories. If the operation 502 includes receiving a plurality of reference trajectories, aspects of the process 500 can be performed in parallel (e.g., substantially simultaneously) to generate optimized trajectories for selecting an optimized trajectory to control a vehicle, as discussed herein.

At operation 504, the process can include evaluating one or more loss functions. In some cases, the operation 504 can include substantially simultaneously evaluating a plurality of individual loss functions as an aggregated loss function, which, accordingly, can substantially simultaneously optimize controls for the vehicle (e.g., an acceleration and steering angle) at individual points along an optimized trajectory. In some instances, the operation 504 can include evaluating a loss functions in operations 506, 508, 510, and/or 512.

At operation 506, the process can include evaluating a loss function based at least in part on a first distance between an autonomous vehicle and an object in the environment. For example, the operation 506 can include penalizing a trajectory where the autonomous vehicle is too close to static or dynamic obstacles in an environment. In some examples, the operation 506 can include evaluating the equation (18), discussed above.

At operation 508, the process can include evaluating a loss function based at least in part on a first distance between the autonomous vehicle and a corresponding point associated with the reference trajectory. In some examples, the operation 508 can include penalizing a trajectory where the autonomous vehicle deviates away from the reference trajectory received in the operation 502. That is, in general, a cost of a trajectory can increase as the distance between the optimized trajectory and the reference trajectory increases. In some examples, the operation 508 can include evaluating the equations (16) and (17), discussed above. In some examples, equation (17) can be used to evaluate a cost of at an endpoint (e.g., point N) of the trajectory, while equation (16) can be used to evaluate costs at points i to N−1.

At operation 510, the process can include evaluating a loss function based at least in part on the plurality of target velocities (or a plurality of target accelerations) of the autonomous vehicle (e.g., to minimize or penalize differences between the target velocities/accelerations and the optimized velocities/accelerations). In some examples, the operation 510 can include evaluating the equation (20), discussed above. In some examples, the operation 510 can be based at least in part on maximum and minimum accelerations allowable for the vehicle to execute (e.g., to ensure safety, comfort, and/or performance of the vehicle).

At operation 512, the process can include evaluating a loss function based at least in part on the plurality of target steering angles or curvature values (e.g., to minimize or penalize differences between the target steering angles/curvature values and the optimized steering angles/curvature values). In some examples, the operation 512 can include evaluating the equation (19), discussed above. In some examples, the operation 512 can evaluate the steering angles and/or curvature values based at least in part on the distances of the autonomous vehicle to various objects in the environment. In some instances, determining a steering angle (or curvature value) can be further based at least in part on a maximum lateral acceleration for safety, comfort, and/or performance of the vehicle.

As discussed herein, the operation 504 can include evaluating all the loss functions substantially simultaneously, while evaluating equation (21) for all points of the reference trajectory/optimized trajectory exclusive of the endpoint N, while evaluating equation (22) for the costs at the endpoint N of the trajectory.

At operation 514, the process can include generating an optimized trajectory. For example, the operation 514 can include iteratively generating candidate trajectories and evaluating the loss functions until the loss functions converge at an optimized trajectory. In some examples, the operation 514 can include using a projected stage-wise Newton method to generate an optimized trajectory. In some instances, the target accelerations and target steering angles can be evaluated in a substantially simultaneous manner to efficiently generate the optimized trajectory.

At operation 516, the process can include controlling an autonomous vehicle in accordance with the optimized trajectory. In some instances, the optimized trajectory can be provided to the trajectory smoother component 242 and/or the trajectory tracker component 244 to refine the optimized trajectory and/or to generate control signals for the various motors and steering actuators of the autonomous vehicle.

Example Clauses

A: A system comprising: a processor; and a computer-readable media storing instructions executable by the processor, wherein the instructions, when executed, cause the system to perform operations comprising: receiving a reference trajectory comprising a plurality of target velocities and a plurality of target curvatures, wherein a target velocity of the plurality of target velocities is associated with a corresponding target curvature of the plurality of target curvatures; optimizing a desired trajectory with respect to the reference trajectory to generate an optimized trajectory comprising a plurality of optimized target velocities and a plurality of optimized target curvatures, wherein: an optimized target velocity of the plurality of optimized target velocities is associated with a corresponding optimized target curvature of the plurality of optimized target curvatures; an acceleration associated with the plurality of target velocities and the plurality of target curvatures are optimized substantially simultaneously; and the optimizing is based at least in part on a closed-form solution of longitudinal dynamics of a vehicle; and controlling an autonomous vehicle to traverse an environment based at least in part on the optimized trajectory.

B: The system of paragraph A, wherein optimizing the desired trajectory with respect to the reference trajectory further comprises evaluating one or more of: a first loss function based at least in part on a first distance between a point of the desired trajectory and an object in the environment; a second loss function based at least in part on a second distance between the point of the desired trajectory and a corresponding point associated with the reference trajectory; a third loss function based at least in part on the plurality of target velocities associated with the autonomous vehicle; or a fourth loss function based at least in part on the plurality of target curvatures.

C: The system of paragraph B, wherein optimizing the desired trajectory with respect to the reference trajectory further comprises substantially simultaneously evaluating the first loss function, the second loss function, the third loss function, and the fourth loss function.

D: The system of any of paragraphs A-C, wherein optimizing the desired trajectory with respect to the reference trajectory further comprises evaluating a loss function based at least in part on a projected stage-wise Newton method.

E: The system of any of paragraphs A-D, wherein optimizing the desired trajectory with respect to the reference trajectory to generate the optimized trajectory comprises executing a projected stage-wise Newton method to a single convergence with respect to a loss function.

F: The system of any of paragraphs A-E, wherein controls associated with the optimized trajectory comprise an acceleration control associated with the autonomous vehicle and a steering angle control associated with the autonomous vehicle for a single frame of the optimized trajectory.

G: A method comprising: receiving a reference trajectory comprising a plurality of target velocities and a plurality of target curvatures, wherein a target velocity of the plurality of target velocities is associated with a corresponding target curvature of the plurality of target curvatures; optimizing a desired trajectory with respect to the reference trajectory to generate an optimized trajectory comprising a plurality of optimized target velocities and a plurality of optimized target curvatures, wherein: an optimized target velocity of the plurality of optimized target velocities is associated with a corresponding optimized target curvature of the plurality of optimized target curvatures; an acceleration associated with the plurality of target velocities and the plurality of target curvatures are optimized substantially simultaneously; and the optimizing is based at least in part on a closed-form solution of longitudinal dynamics of a robotic platform; and controlling the robotic platform to traverse an environment based at least in part on the optimized trajectory.

H: The method of paragraph G, wherein optimizing the desired trajectory with respect to the reference trajectory further comprises evaluating one or more of: a first loss function based at least in part on a first distance between a point of the desired trajectory and an object in the environment; a second loss function based at least in part on a second distance between the point of the desired trajectory and a corresponding point associated with the reference trajectory; a third loss function based at least in part on the plurality of target velocities associated with the robotic platform; or a fourth loss function based at least in part on the plurality of target curvatures.

I: The method of paragraph H, wherein optimizing the desired trajectory with respect to the reference trajectory further comprises substantially simultaneously evaluating the first loss function, the second loss function, the third loss function, and the fourth loss function.

J: The method of any of paragraphs G-I, wherein optimizing the desired trajectory with respect to the reference trajectory further comprises evaluating a loss function based at least in part on a projected stage-wise Newton method.

K: The method of any of paragraphs G-J, wherein optimizing the desired trajectory with respect to the reference trajectory to generate the optimized trajectory comprises executing a projected stage-wise Newton method to a single convergence.

L: The method of any of paragraphs G-K, wherein, for a first point of the optimized trajectory, a second point of the optimized trajectory is a function of a yaw angle of the robotic platform at the first point and a curvature of a segment of the optimized trajectory at the first point, wherein the second point is subsequent to the first point and adjacent to the first point.

M: The method of any of paragraphs G-L, wherein the reference trajectory corresponds to a candidate action of the robotic platform, wherein the reference trajectory is one of a plurality of reference trajectories, and wherein the desired trajectory is one of a plurality of desired trajectories, the method further comprising: individually optimizing the plurality of desired trajectories with respect to the plurality of reference trajectories to generate a plurality of optimized trajectories; and controlling the robotic platform to traverse the environment based at least in part on a cost associated with the optimized trajectory.

N: The method of any of paragraphs G-M, wherein a size of the reference trajectory is based at least in part on a receding horizon associated with the robotic platform.

O: A non-transitory computer-readable medium storing instructions that, when executed, cause a processor to perform operations comprising: receiving a reference trajectory comprising a plurality of target velocities and a plurality of target curvatures, wherein a target velocity of the plurality of target velocities is associated with a corresponding target curvature of the plurality of target curvatures; optimizing a desired trajectory with respect to the reference trajectory to generate an optimized trajectory comprising a plurality of optimized target velocities and a plurality of optimized target curvatures, wherein: an optimized target velocity of the plurality of optimized target velocities is associated with a corresponding optimized target curvature of the plurality of optimized target curvatures; an acceleration associated with the plurality of target velocities and the plurality of target curvatures are optimized substantially simultaneously; and the optimizing is based at least in part on a closed-form solution of longitudinal dynamics of a robotic platform; and controlling the robotic platform to traverse an environment based at least in part on the optimized trajectory.

P: The non-transitory computer-readable medium of paragraph O, wherein optimizing the desired trajectory with respect to the reference trajectory further comprises evaluating one or more of: a first loss function based at least in part on a first distance between a point of the desired trajectory and an object in the environment; a second loss function based at least in part on a second distance between the point of the desired trajectory and a corresponding point associated with the reference trajectory; a third loss function based at least in part on the plurality of target velocities associated with the robotic platform; or a fourth loss function based at least in part on the plurality of target curvatures.

Q: The non-transitory computer-readable medium of paragraph P, wherein optimizing the desired trajectory with respect to the reference trajectory further comprises substantially simultaneously evaluating the first loss function, the second loss function, the third loss function, and the fourth loss function.

R: The non-transitory computer-readable medium of any of paragraphs O-Q, wherein optimizing the desired trajectory with respect to the reference trajectory further comprises evaluating a loss function based at least in part on a projected stage-wise Newton method.

S: The non-transitory computer-readable medium of any of paragraphs O-R, wherein optimizing the desired trajectory with respect to the reference trajectory to generate the optimized trajectory comprises executing a projected stage-wise Newton method to a single convergence.

T: The non-transitory computer-readable medium of any of paragraphs O-S, wherein controls associated with the optimized trajectory comprise an acceleration control associated with the robotic platform and a steering angle control associated with the robotic platform for a single frame of the optimized trajectory.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   a processor; and
   a computer-readable media storing instructions executable by the processor, wherein the instructions, when executed, cause the system to perform operations comprising:
   receiving a reference trajectory comprising a plurality of target velocities and a plurality of target curvatures, wherein a target velocity of the plurality of target velocities is associated with a corresponding target curvature of the plurality of target curvatures;
   optimizing a desired trajectory with respect to the reference trajectory to generate an optimized trajectory comprising a plurality of optimized target velocities and a plurality of optimized target curvatures, wherein:
an optimized target velocity of the plurality of optimized target velocities is associated with a corresponding optimized target curvature of the plurality of optimized target curvatures;
an acceleration associated with the plurality of target velocities and the plurality of target curvatures are optimized substantially simultaneously; and
the optimizing is based at least in part on a closed-form solution of longitudinal dynamics of a vehicle; and
controlling an autonomous vehicle to traverse an environment based at least in part on the optimized trajectory.

2. The system of claim 1, wherein optimizing the desired trajectory with respect to the reference trajectory further comprises evaluating one or more of:
a first loss function based at least in part on a first distance between a point of the desired trajectory and an object in the environment;
a second loss function based at least in part on a second distance between the point of the desired trajectory and a corresponding point associated with the reference trajectory;
a third loss function based at least in part on the plurality of target velocities associated with the autonomous vehicle; or
a fourth loss function based at least in part on the plurality of target curvatures.

3. The system of claim 2, wherein optimizing the desired trajectory with respect to the reference trajectory further comprises substantially simultaneously evaluating the first loss function, the second loss function, the third loss function, and the fourth loss function.

4. The system of claim 1, wherein optimizing the desired trajectory with respect to the reference trajectory further comprises evaluating a loss function based at least in part on a projected stage-wise Newton method.

5. The system of claim 1, wherein optimizing the desired trajectory with respect to the reference trajectory to generate the optimized trajectory comprises executing a projected stage-wise Newton method to a single convergence with respect to a loss function.

6. The system of claim 1, wherein controls associated with the optimized trajectory comprise an acceleration control associated with the autonomous vehicle and a steering angle control associated with the autonomous vehicle for a single frame of the optimized trajectory.

7. A method comprising:
receiving a reference trajectory comprising a plurality of target velocities and a plurality of target curvatures, wherein a target velocity of the plurality of target velocities is associated with a corresponding target curvature of the plurality of target curvatures;
optimizing a desired trajectory with respect to the reference trajectory to generate an optimized trajectory comprising a plurality of optimized target velocities and a plurality of optimized target curvatures, wherein:
an optimized target velocity of the plurality of optimized target velocities is associated with a corresponding optimized target curvature of the plurality of optimized target curvatures;
an acceleration associated with the plurality of target velocities and the plurality of target curvatures are optimized substantially simultaneously; and
the optimizing is based at least in part on a closed-form solution of longitudinal dynamics of a robotic platform; and
controlling the robotic platform to traverse an environment based at least in part on the optimized trajectory.

8. The method of claim 7, wherein optimizing the desired trajectory with respect to the reference trajectory further comprises evaluating one or more of:
a first loss function based at least in part on a first distance between a point of the desired trajectory and an object in the environment;
a second loss function based at least in part on a second distance between the point of the desired trajectory and a corresponding point associated with the reference trajectory;
a third loss function based at least in part on the plurality of target velocities associated with the robotic platform; or
a fourth loss function based at least in part on the plurality of target curvatures.

9. The method of claim 8, wherein optimizing the desired trajectory with respect to the reference trajectory further comprises substantially simultaneously evaluating the first loss function, the second loss function, the third loss function, and the fourth loss function.

10. The method of claim 7, wherein optimizing the desired trajectory with respect to the reference trajectory further comprises evaluating a loss function based at least in part on a projected stage-wise Newton method.

11. The method of claim 7, wherein optimizing the desired trajectory with respect to the reference trajectory to generate the optimized trajectory comprises executing a projected stage-wise Newton method to a single convergence.

12. The method of claim 7, wherein, for a first point of the optimized trajectory, a second point of the optimized trajectory is a function of a yaw angle of the robotic platform at the first point and a curvature of a segment of the optimized trajectory at the first point, wherein the second point is subsequent to the first point and adjacent to the first point.

13. The method of claim 7, wherein the reference trajectory corresponds to a candidate action of the robotic platform, wherein the reference trajectory is one of a plurality of reference trajectories, and wherein the desired trajectory is one of a plurality of desired trajectories, the method further comprising:
individually optimizing the plurality of desired trajectories with respect to the plurality of reference trajectories to generate a plurality of optimized trajectories; and
controlling the robotic platform to traverse the environment based at least in part on a cost associated with the optimized trajectory.

14. The method of claim 7, wherein a size of the reference trajectory is based at least in part on a receding horizon associated with the robotic platform.

15. A non-transitory computer-readable medium storing instructions that, when executed, cause a processor to perform operations comprising:
receiving a reference trajectory comprising a plurality of target velocities and a plurality of target curvatures, wherein a target velocity of the plurality of target velocities is associated with a corresponding target curvature of the plurality of target curvatures;
optimizing a desired trajectory with respect to the reference trajectory to generate an optimized trajectory comprising a plurality of optimized target velocities and a plurality of optimized target curvatures, wherein:

an optimized target velocity of the plurality of optimized target velocities is associated with a corresponding optimized target curvature of the plurality of optimized target curvatures;
an acceleration associated with the plurality of target velocities and the plurality of target curvatures are optimized substantially simultaneously; and
the optimizing is based at least in part on a closed-form solution of longitudinal dynamics of a robotic platform; and
controlling the robotic platform to traverse an environment based at least in part on the optimized trajectory.

16. The non-transitory computer-readable medium of claim 15, wherein optimizing the desired trajectory with respect to the reference trajectory further comprises evaluating one or more of:
a first loss function based at least in part on a first distance between a point of the desired trajectory and an object in the environment;
a second loss function based at least in part on a second distance between the point of the desired trajectory and a corresponding point associated with the reference trajectory;
a third loss function based at least in part on the plurality of target velocities associated with the robotic platform; or
a fourth loss function based at least in part on the plurality of target curvatures.

17. The non-transitory computer-readable medium of claim 16, wherein optimizing the desired trajectory with respect to the reference trajectory further comprises substantially simultaneously evaluating the first loss function, the second loss function, the third loss function, and the fourth loss function.

18. The non-transitory computer-readable medium of claim 15, wherein optimizing the desired trajectory with respect to the reference trajectory further comprises evaluating a loss function based at least in part on a projected stage-wise Newton method.

19. The non-transitory computer-readable medium of claim 15, wherein optimizing the desired trajectory with respect to the reference trajectory to generate the optimized trajectory comprises executing a projected stage-wise Newton method to a single convergence.

20. The non-transitory computer-readable medium of claim 15, wherein controls associated with the optimized trajectory comprise an acceleration control associated with the robotic platform and a steering angle control associated with the robotic platform for a single frame of the optimized trajectory.

* * * * *